MAGNETIC MEMORY CONSTRUCTION AND CIRCUITS

Filed March 9, 1960 4 Sheets-Sheet 1

INVENTOR
D. G. CLEMONS
BY William H. Kamstra
ATTORNEY

April 2, 1963 D. G. CLEMONS 3,084,336

MAGNETIC MEMORY CONSTRUCTION AND CIRCUITS

Filed March 9, 1960 4 Sheets-Sheet 2

INVENTOR
D. G. CLEMONS
BY William H. Kamstra
ATTORNEY

INVENTOR
D. G. CLEMONS
BY William H. Kamstra
ATTORNEY

MAGNETIC MEMORY CONSTRUCTION AND CIRCUITS
Filed March 9, 1960 4 Sheets-Sheet 4
FIG. 3
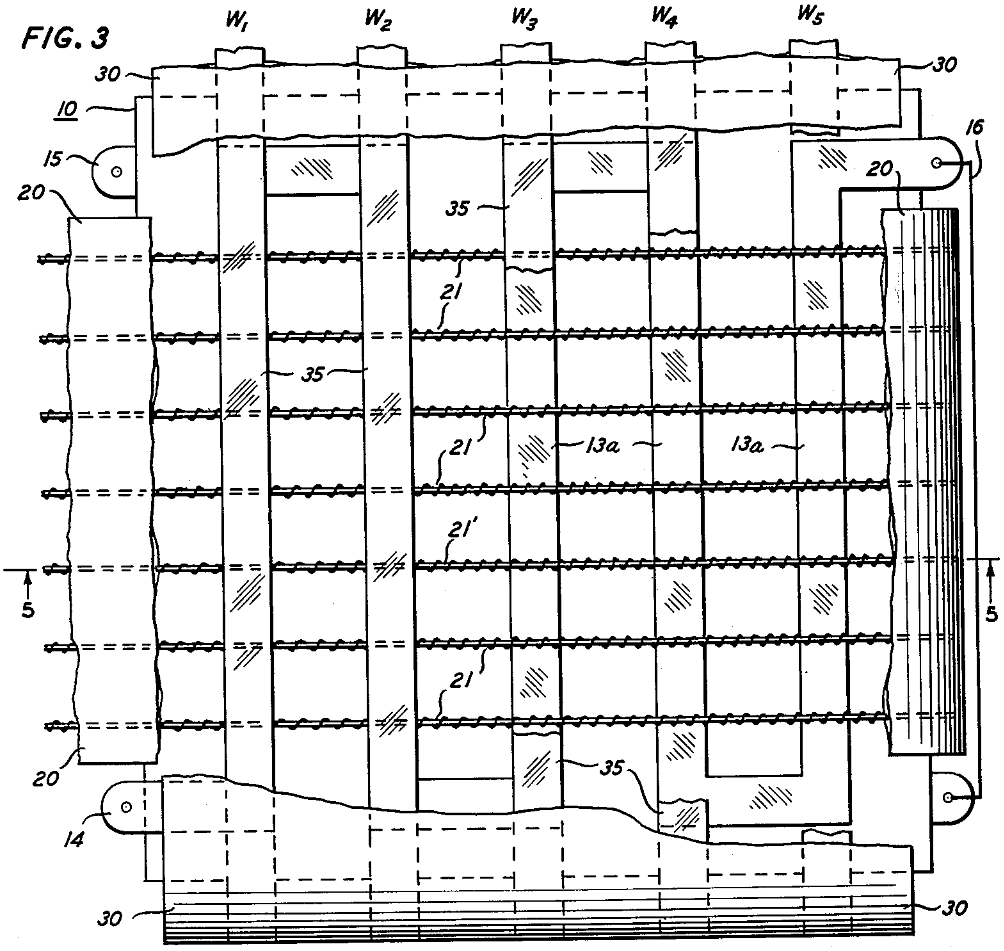
FIG. 4
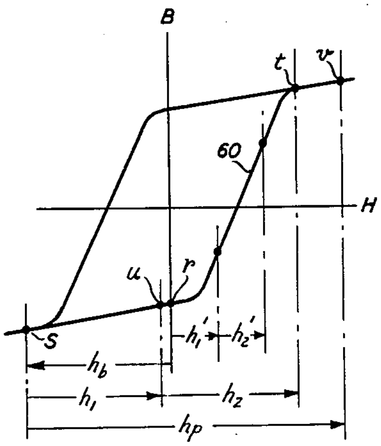
FIG. 6
| | $W_1$ | | $W_2$ | | $W_3$ | | $W_4$ | | $W_5$ | |
|---|---|---|---|---|---|---|---|---|---|---|
| | 44 | 54 | 44 | 54 | 44 | 54 | 44 | 54 | 44 | 54 |
| PLANE A | − | − | + | − | − | − | + | − | − | − |
| PLANE B | − | + | + | + | − | + | + | + | − | + |
INVENTOR
D. G. CLEMONS
BY
William H. Kamstra
ATTORNEY United States Patent Office 3,084,336
Patented Apr. 2, 1963

3,084,336

MAGNETIC MEMORY CONSTRUCTION AND CIRCUITS

Donald G. Clemons, Newark, N.J., assignor to Bell Telephone Laboratories, Incorporated, New York, N.Y., a corporation of New York Filed Mar. 9, 1960, Ser. No. 13,960
11 Claims. (Cl. 340—174)

This invention relates to electrical circuit arrangements and constructions adapted for the storage of information and more particularly to such arrangements and constructions in which information is stored in conjunction with magnetic wire memory elements.

Magnetic memory arrays in which an information bit is stored in conjunction with a particular magnetic state of a magnetic memory element are well known in the information handling art. Such storage is predicated upon the square loop hysteresis characteristics of the magnetic material of which the individual memory elements are fabricated. Thus a rectangularity of the loop makes possible two remanent magnetic states in the memory element, in either of which state the element may be caused to remain without the expenditure of power until the application of a sufficient magnetomotive force in the opposite direction, as is also well known. The magnetomotive force, whether applied as a writing operation or during interrogation of an information bit stored, may be generated by a single current of sufficient magnitude applied to an energizing winding inductively coupled to the memory element. The magnetomotive force may also be generated by two or more coincident partial currents applied to a plurality of windings coupled to the element. In the latter case, although each of the partial currents alone is of insufficient magnitude to generate a switching magnetomotive force, the total effect of the coincident currents causes a complete excursion of the flux in the element from one remanent point on the hysteresis loop to the other.

In the conventional mode of coincident current operation, two partial currents are applied to perform a selective writing or reading in a coordinate arrangement of memory elements. Either of the currents alone is determined to be of sufficient magnitude to cause a flux excursion short of the "knee" of the hysteresis loop. The magnitude of the coincidently applied other partial current must then be sufficient to complete the flux excursion to the point of opposite saturation. At this point the rectangularity of the hysteresis loop of the material of which the memory element is fabricated becomes of considerable importance. Thus if the slopes of the loop are not sufficiently steep the added coincident currents, although singly of sufficient magnitude only to drive the flux short of the "knee" of the loop, together may not be of sufficient magnitude to complete a flux excursion into opposite saturation. If each of the partial currents in the foregoing case is increased in magnitude so that a complete flux excursion will result as a consequence of their addition, each of the partial currents singly, although not sufficient to cause a complete flux excursion, may yet be sufficient to drive the flux around the "knee" of the loop and generate spurious signals at nonselected bit addresses of the memory array.

In connection wtih the employment of conventional toroidal magnetic cores as individual information addresses of a memory array, the rectangularity of the hysteresis loop of the magnetic material generally is sufficient to serve a flux switching purpose. Magnetic materials suitable for this purpose which display sufficiently "square" loops are known and generally are available for coincident current operation. Similarly, when the more latterly introduced magnetic wire memory elements are employed to comprise the storage means, sufficient rectangularity of the hysteresis loop of the magnetic materials is available to make coincident current operation possible. When the magnetic wire memory elements are used to make up a memory array it frequently becomes advantageous, however, in order to exploit to the fullest extent the novel character of these elements, to operate the wire element in the coincident current mode under conditions where some rectangularity of the loop is sacrificed. Thus, for example, in order to achieve a higher bit density, it frequently becomes advantageous to decrease the length of each information bit address on the wire memory element. Such a decrease, however, in many cases tends to increase the slope of the hysteresis loop of the element address with a result that further decrease is limited if coincident current operation is required.

In many magnetic memory arrangements capable of storing a bit of information in the form of one or the other condition of remanent magnetization, the character of an information bit is destroyed in the process of its interrogation. Thus, the character of an information bit stored in a memory element is manifested in the ability of the element to respond to an applied interrogating magnetomotive force, whether this magnetomotive force is generated by coincident currents or by a single interrogating current. As is well known, a complete flux excursion in response to the interrogating magnetomotive force is indicative of the storage in the memory element of one information bit and a drive further into saturation responsive thereto is indicative of another information bit. In the one case a full valued output signal is generated in an output winding coupled to the memory element and in the latter case, only a negligible shuttle signal is so generated. This operative situation also obtains in permanent memory arrangements where the ability of a memory element to respond to an applied interrogating drive is controlled by the association with the memory element of a permanent magnet means. Where such a permanent magnet means is placed in juxtaposition with a memory element comprising an information address, the element is prevented or disabled from switching its remanent magnetic condition responsive to the interrogating drive. Where the memory element is not so disabled the magnetic state of the information address is such that a complete flux excursion from one remanent point on its loop to the other may be caused responsive to the interrogating drive. In the latter case it is clear that, during a subsequent interrogation, no swtiching will occur unless the memory element has first been restored to its information bearing magnetic state.

A common aspect of the foregoing problems thus is to restore the memory element comprising the information address to its information bearing magnetic remainent state after an interrogation and at the same time to stabilize this state on the hysteresis loop of the material of which the element is fabricated at a point so that coincident current operation is facilitated.

Accordingly, it is one object of the invention to provide an energizing circuit arrangement which permits the use of coincident current techniques in connection with magnetic memory elements without regard to the rectangularity of the hysteresis characteristic loop of the magnetic material of which the memory element is fabricated.

It is another object of this invention to provide a new and novel circuit arrangement for restoring a magnetic memory element after each interrogation to a permanent point on its hysteresis loop which will at the same time facilitate the use of coincident current techniques when the rectangularity of the loop is less than optimum for any reason.

Still another object of this invention is to provide coincident current energizing circuit arrangements adapted for use in connection with magnetic wire memory elements.

In accordance with another aspect of this invention it is also an object thereof to provide a magnetic memory construction which is more simple and readily fabricated and achieves a greater component economy than has heretofore been possible.

In the construction of magnetic memory arrays generally it is obviously advantageous to achieve a simple and compact structure, one which is readily fabricated at minimum cost in time and materials. In view of considerations such as the threading of the memory elements by the energizing conductors, mounting of the elements, and the like, presented in memory arrangements employing conventional toroidal cores as the information storage means, limitations are frequently encountered beyond which further simplification is unfeasible. The advent of magnetic wire memory elements such as those described, for example, in the copending application of A. H. Bobeck, Serial No. 675,522, filed August 1, 1957, however, has made possible advances in structure simplification and savings in circuit components not readily achievable with the priorly known core information storage arrangements. The magnetic wire memory elements and their known tape-like associated energizing solenoids lend themselves to a structural flexibility which the inherent nature of the conventional toroidal core elements precludes.

Accordingly, it is still another object of this invention to provide a new and improved magnetic memory construction.

Another object of this invention is to provide a simplified magnetic memory construction and operation, which construction and operation at the same time makes possible the use of coincident current techniques in connection with individual magnetic wire memory elements without regard to the rectangularity of the hysteresis characteristic loop of the magnetic material of which the memory elements are fabricated.

The foregoing and other objects of this invention are realized in one specific illustrative embodiment thereof in which groups of wire memory elements and associated groups of energizing solenoids, each group of which is advantageously mounted in a flexible insulating tape, are folded and refolded to make up a coordinate array memory stack. The energizing solenoids may comprise a plurality of single conductors closely associated together by coiling them about the wire memory elements such that when traversed by a current a magnetic field is generated acting along the axes of the wire memory elements. However, more advantageously, in realizing the objects of this invention, the solenoids take the form of flat strip conductors which are more easily fabricated than, and manifestly are the physical and electrical equivalents of, a plurality of individual conductors closely adjacently arranged. Since the flat strip conductors perform the precise function of their equivalent grouped wire counterparts, that is, generate a magnetic field responsive to the passage of a current therethrough, they will be referred to by the general term "solenoid" in accordance with known practice in the art. A single basic memory plane of the stack comprises, first, a parallel arrangement of first X-drive solenoids, which solenoids are serially connected at alternate ends such that a current applied at a terminal of a first solenoid passes in alternating directions through the adjacently arranged subsequent first X-drive solenoids. The tape containing parallelly arranged magnetic wire memory elements is then laid transversely over the first X-drive solenoids to have defined thereon by the latter solenoids a coordinate array of information address segments. A second tape containing parallelly arranged second X-drive solenoids, which solenoids may also advantageously comprise flat strip conductors, is laid over the memory wire tape such that the second X-drive solenoids are also transverse to the wire memory elements and in registration with the parallel first X-drive solenoids. The first and second X-drive solenoids on opposite sides of the wire memory element are thus in inductive coupling with the latter elements at the information addresses defined thereon. The parallelly arranged wire memory elements, in their transverse relationship with the first and second X-drive solenoids, constitute the Y coordinates defining the coordinate array of address segments. In accordance with the permanent store mode of operation of the illustrative embodiment of this invention being generally described, an information card having mounted thereon a pattern of permanent magnet means representing the information to be stored is placed over the second X-drive solenoid tape. The permanent magnet means are so arranged that the fields of the magnet means effectively saturate the segments of the wire memory elements which constitute the information addresses of the memory array plane. The principles of operation and the general circuit organization of the permanent information store contemplated herein is described in the copending application of the administratrix of the estate of S. M. Shackell, deceased, Serial No. 708,127, filed January 10, 1958.

A second memory plane of the stack is added by arranging a second parallel arrangement of first X-drive solenoids adjacent the first and in serial connection therewith. The relationship between the two groups of first X-drive solenoids is such that a current applied to the first X-drive solenoids of the first plane continues in alternating directions through the first X-drive solenoids of the second plane with the current in adjacent first X-drive solenoids of the two planes being in the same direction. The development of the second plane is continued by transversely folding the tape containing the parallelly arranged magnetic wire memory elements around and into inductive relationship with the first X-drive solenoids of the second plane. The tape containing the second X-drive solenoids of the first plane is similarly transversely folded around and into inductive relationship with the parallelly arranged wire memory elements of the second plane. A second information card having permanent magnet means mounted thereon in a pattern corresponding to other information is placed over the second X-drive solenoids of the second plane in the manner described for the first plane.

In the foregoing two-plane arrangement, each plane is, in its operational effect, separate and distinct from the other and the information stored in one may be operated upon for reading and writing purposes without in any way disturbing the information stored in the other as will be demonstrated in detail hereinafter. The foregoing two-plane arrangement, however, in accordance with the principles of this invention, constitutes a structural unit which may advantageously be multiplied in either direction to make up a three-dimensional memory stack of almost any required capacity. Thus by adding adjacent groups of first X-drive solenoids the tapes containing the wire memory elements and the second X-drive solenoids may be alternatively and continuously folded and refolded into inductive relationship to comprise the memory planes. The foregoing folded construction is advantageously arranged so that information cards may be removed and replaced at each plane from the same side of the memory stack.

The coincident current operation of the memory array according to the principles of this invention is on a word-organized basis. Thus, by applying a first partial switching current to a particular one of the second X-drive solenoids particular information words having corresponding addresses are selected in the memory planes. In accordance with conventional practice, the partial current which is applied to the second X-drive solenoids folded through the entire memory stack is of sufficient magnitude to supply at least half the magnetomotive force required to cause a flux switching at an address segment. Coincidentally with the first partial switching current, a second partial switching current of substantially the same magnitude is applied to the serially connected first X-drive solenoids of a selected memory plane. However, since the first X-drive solenoids of two adjacent memory planes are serially connected, it is apparent that the information segments of a selected word in each of the two planes will have two half-valued switching drives applied thereto. It will be recalled that the current in a first X-drive solenoid of one plane will be in the same direction as the current in the serially connected corresponding first X-drive solenoid of the adjacent plane. Accordingly, in one of the planes the partial magnetomotive forces generated by the coincident partial switching currents in the first and second X-drive solenoids will be additive while in the other plane of the two-plane unit the magnetomotive forces so generated will effectively cancel. The polarity of the partial current applied to the first X-drive solenoids is thus determined so that additive magnetomotive forces are applied to the information address segments containing the bits of the information word to be interrogated. Should the selected word lie in the adjacent plane of the two plane unit, the polarity of the partial switching current applied to the second X-drive solenoids is reversed to interrogate the selected word.

The ability of the address segments containing an interrogated information word to respond to the additive interrogating drives is controlled by the presence or absence of a permanent magnet means at a particular information address in accordance with the principles of the permanent memory arrangement described in the copending Shackell application referred to hereinbefore. Thus, since such a permanent magnet at an information address inhibits any flux switching whatsoever no output signal is induced across the wire memory element including the address segment interrogated. In accordance with conventional practice, such an absence of output signal is indicative of the storage in the interrogated address segment of a binary "0." Where, in the selected word, an address segment is uninhibited by a permanent magnet means a flux switching occurs in response to the applied additive interrogating magnetomotive forces and, as a result, an output signal is induced across the ends of the wire memory element containing the switching address segment. This is also in accord with conventional practice where such an output signal is indicative of the storage in the interrogated address segment of a binary "1."

In accordance with another aspect of this invention a continuous biasing current is applied to each of the wire memory elements, which biasing current serves to magnetically bias each information address segment of the memory wires in the direction opposite to that in which the additive magnetomotive forces tend to drive them. As a result, a full flux switching from one state of remanent magnetization to the other is insured where such a switching is possible in response to an applied interrogating drive. Advantageously this magnetic bias also serves to restore the address segments to a switchable magnetic state after each interrogation to provide complete nondestructive read out.

Equally important and in accordance with still another aspect of this invention, the magnetic bias so applied makes possible the coincident current operation generally described hereinbefore. By magnetically biasing the wire memory elements sufficiently into saturation in one direction on the hysteresis loop of the material of which the memory elements are fabricated, sufficient operating margins are achieved to insure the required discrimination between switching and nonswitching of the address segments responsive to the added and single interrogating drives, respectively, notwithstanding the lack of complete rectangularity of the hysteresis loop of the magnetic material employed.

An advantageous circuit organization and construction is thus provided in the present invention which lends itself to the assembly of three-dimensional memory array stacks and exploits to a greater extent than heretofore possible the physical flexibility of magnetic wire memory elements and their associated flat strip solenoids. The alternating directions of the energizing solenoids with respect to the address segments which they define on the wire memory elements also advantageously provide for the substantial concellation of so-called shuttle output signals. The latter signals are generated responsive to the application of only single partial switching currents to the energizing solenoids of unselected word segments as is well known. Although in the general description provided in the foregoing the novel construction contemplates the employment of changeable information magnet cards as the medium controlling the storage of information bits, the particular memory construction and assembly according to this invention may with equal facility be adapted for use in conjunction with variable memories in which information bits are stored in the form of different remanent states in the information address segments of the wire memory elements. Thus the coincident current operation made possible by the superimposed first and second X-drive solenoids may also be effective to interrogate the particular magnetic state of the information address segments containing the bits which are then represented as one or the other condition of remanent magnetization. In such a case associated circuitry of a character well known in the art is employed to restore the information representative magnetic states to the address segments of the memory wires where those states have been switched during interrogation.

The various features of this invention thus include a magnetic memory construction in which nonmagnetic insulated tapes having embedded therein wire memory elements and energizing solenoids are folded and refolded about a basic unit containing other sets of energizing solenoids to build up a memory array stack. By so folding and refolding the tapes the memory elements and energizing solenoids are brought into inductive relationship, which relationship is accurately maintained by the interfolded tapes.

According to another feature of this invention a pair of solenoids are superimposed to define an information word address on a plurality of wire memory elements, the pair of solenoids being separately energizable by partial switching currents to achieve coincident current operation.

It is still another feature of this invention that adjacent first solenoids of the pairs of solenoids of the same plane or of an adjacent plane of a three-dimensional memory array referred to in the foregoing paragraph are serially connected in a manner such that coincident interrogating magnetomotive forces generated by the adjacent pairs of energizing solenoids are additive with respect to one group of the defined information address segments and effectively cancel with respect to the other group of defined information address segments.

It is also a feature of this invention that an information address segment of a magnetic wire memory element be magnetically biased on its hysteresis loop at a point such as to afford sufficient operating margins to permit coincident operation without regard to the lack of complete rectangularity of the hysteresis loop.

It is yet another feature of this invention that magnetic wire memory elements are continuously folded and refolded through a three-dimensional magnetic memory array stack and that one set of energizing conductors associated with the wire memory elements are also continuously folded and refolded through the stack transversely to the wire memory elements and into inductive coupling therewith.

The foregoing and other objects and features of this invention may be better understood from a consideration of a detailed description of one illustrative embodiment thereof when taken in conjunction with the accompanying drawing in which:

FIG. 1 is a perspective view of a circuit board unit showing one set of energizing solenoids, around which unit tapes containing other solenoids and memory elements are folded to achieve a basic two-plane memory stack according to the principles of this invention;

FIGS. 2A and 2B together show a perspective view of a single two-plane memory stack broken from a multiplane memory according to this invention showing the elements loosely assembled for purposes of clarity;

FIG. 3 is a plan view of the upper memory plane of the assembly of FIG. 2A with the elements broken away to expose the details of the plane;

FIG. 4 depicts an idealized hysteresis loop of a magnetic material of which the memory elements of this invention may be fabricated;

FIG. 6 is a table showing the polarity of coincident current interrogating pulses at various operative stages of this invention.

Figure 1:
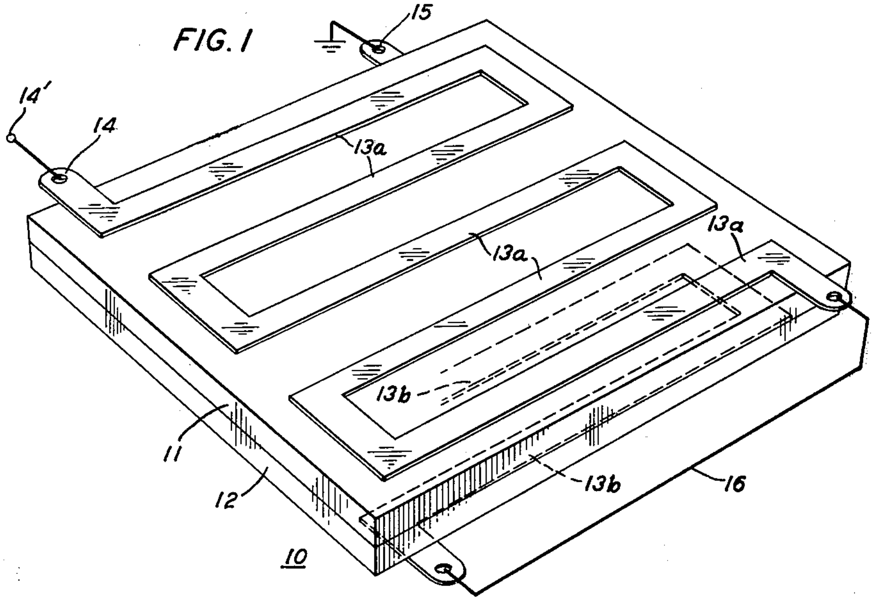
Figure 2A:
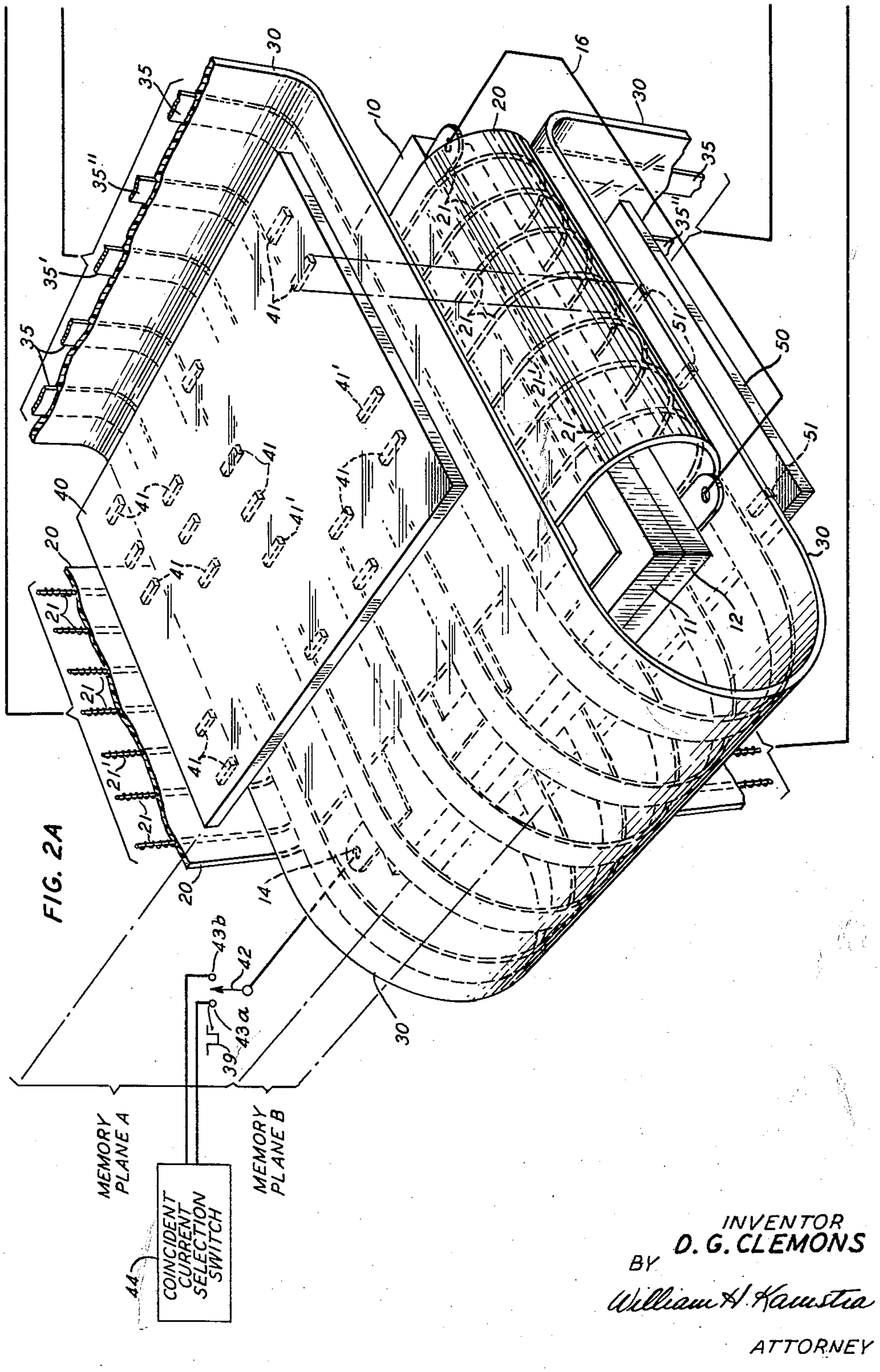
Figure 2B:
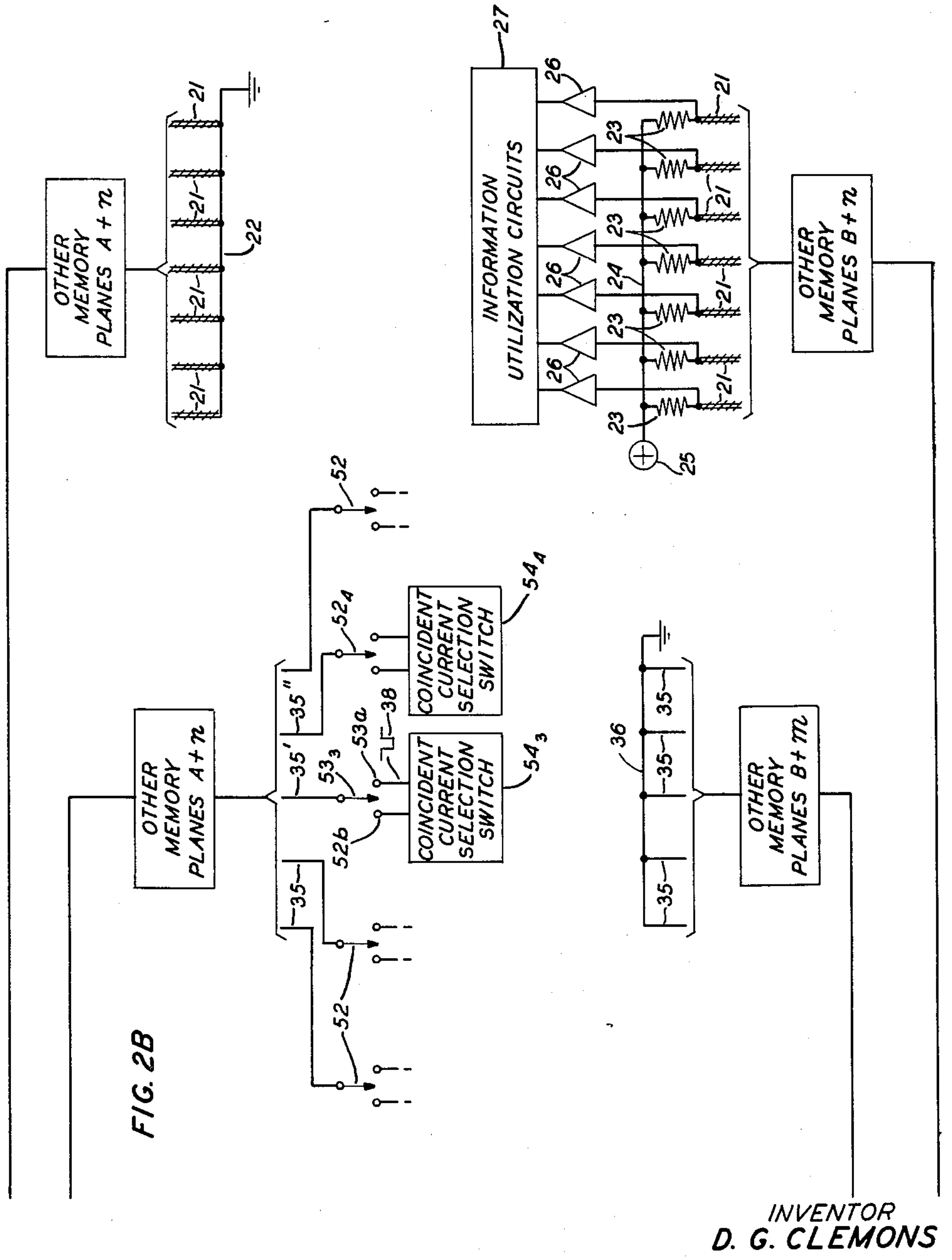

The structural details of one illustrative embodiment of this invention may best be apprehended with reference to FIGS. 1, 2A, and 2B. In FIG. 1 is shown a basic two-plane unit 10 by means of which the construction of a three-dimensional memory array stack according to the principles of this invention is initiated and by means of which the memory stack may be extended in either direction. The basic unit 10 comprises a first and a second circuit board 11 and 12 on each of which is printed by means of well-known printed circuit techniques, or are otherwise affixed thereto, a plurality of parallelly arranged strip conductors **13*a* and 13*b*, which conductors constitute first energizing X coordinate solenoids for the memory planes to be described. The conductors or solenoids 13*a* are connected in series at alternate ends as depicted in FIG. 1, the solenoids 13*b* being similarly connected with the difference that the serial connections are made at opposite ends from the serial connections of the solenoids 13*a*. The circuit boards 11 and 12 are permanently positioned back-to-back in a manner such that the parallel solenoids 13*a* and 13*b* are arranged substantially in registration. The solenoids 13*b* are shown only in partial hidden view in FIG. 1. Convenient tabs 14 and 15 may be provided at one edge of the circuit boards on the solenoids 13*a* and 13*b*, respectively, to provide for circuit connections. At the opposite edge of the circuit boards 11 and 12 a conducting means 16 is provided to connect in series the last solenoids 13*a* and 13*b* of the two circuit boards. It is clear from the foregoing description and the serial connections depicted in FIG. 1 that a current applied to a terminal 14' on the tab 14 will pass to ground connected to the tab 15 in alternating directions through the solenoids 13*a* and 13*b*. Such a current will pass in one direction through any solenoid 13*a* of the circuit board 11 and in the same direction through the corresponding adjacent solenoid 13*b* of the circuit board 12**.

The development of a memory array stack according to the principles of this invention is continued as depicted in FIG. 2A. A flexible insulated nonmagnetic tape 20 having embedded therein a plurality of parallelly arranged magnetic wire memory elements 21 is folded about the unit 10 in a manner such that the elements 21 are disposed transversely to the solenoids **13*a* and 13*b*. The wire memory elements 21 may advantageously be of the character described in the aforementioned copending application of A. H. Bobeck and have axially coincident therewith helical flux components in which flux switching incident to the storage of information is caused to take place. The insulated tape 20 may comprise any flexible tape adapted to serve as a mounting means for the wire elements 21. For this purpose, the transparent material commercially known as Mylar was found suitable, for example. The tape 20 is folded into close proximity with the solenoids 13*a* and 13*b* so that the latter solenoids are in inductive coupling with the wire memory elements 21 at their intersections. After having been folded into position the tape 20 may advantageously by bonded or otherwise permanently maintained in the described relationship with the unit 10** in any manner devisable by one skilled in the art.

A second insulated nonmagnetic tape 30, which tape may also conveniently comprise a transparent Mylar tape, having embedded therein a plurality of parallelly arranged flat strip conductors or solenoids 35, is now folded about the folded structure already described. The tape 30 is folded transversely to the tape 20 in a manner such that the parallel solenoids 35, which solenoids constitute second X coordinate elements, are disposed transversely to the wire memory elements 21 and in registration with the parallel solenoids **13*a* and 13*b* of the circuit boards 11 and 12. The solenoids 35 are thus brought into inductive coupling with the wire memory elements 21 on each side of the circuit boards 11 and 12 at the same segment locations of the later memory elements. After being folded into position, the tape 30 and its solenoids 35 may also be permanently bonded to the folded structure comprising the tape 20 and circuit boards 11 and 12**.

The interfolded structure so far described advantageously comprises the permanent portion of a pair of memory planes A and B. A plan view of the memory plane A so far described is shown in FIG. 3. Portions of the plane are depicted as broken away to demonstrate the transverse relationship of the solenoids **13*a* and 35 and the wire memory elements 21. The superimposed and parallel solenoids 13*a* and 35 having transversely running therebetween the wire memory elements 21 define on the latter elements a coordinate array of information bit addresses. As will appear hereinafter, the specific embodiment of this invention being described is word-organized, each word address of the coordinately arranged array being defined by a solenoid 13*a*—35 pair. Although in FIG. 3 is shown a coordinate memory plane having a capacity of five words of seven bits each, it is to be understood that the principles of this invention are applicable to memory arrays of almost any capacity. The plane A shown in FIG. 3 is duplicated by the plane B on the other side of the circuit board unit 10**, the details of which may be apprehended from arrangements of elements of the plane A shown.

The construction of the foregoing memory stack is continued by the positioning of a pair of information cards 40 and 50 on either side of the two plane stack so far described as shown in FIG. 2A. The card 40 is associated with the memory plane A and has embedded therein or otherwise affixed thereto a coordinate pattern of permanent magnets 41 which magnets are arranged to correspond with particular information bit addresses of plane A. The particular pattern of the magnets 41 is determined in accordance with the information words to be stored in the memory plane A as will be described in detail hereinafter. In a similar manner the information card 50 is positioned so that coordinately arranged permanent magnets 51 similarly held thereon are also in alignment with corresponding information bit adresses of the memory plane B. The magnets 51 are arranged in a particular pattern on the card 50 also in accordance with particular information words to be stored in the memory plane B. The information cards 40 and 50 are of a nonmagnetic insulating material and are so placed with respect to the solenoids 35 and the inner folds of the wire memory elements 21 that the fields of the permanent magnets 41 and 51 effectively magnetically saturate the segments of the elements 21 comprising the corresponding information addresses.

Additional memory planes $A+n$ and $B+m$ may be added in either direction from the planes A and B to achieve a memory stack of any number of planes. The tapes 20 and 30 with their embedded wire elements 21 and solenoids 35 are extended in both directions as may be necessary to completely traverse the memory stack of the particular capacity being constructed. The next adjacent memory plane to the plane A, not shown in the drawing, comprises an associated information card arranged back-to-back with the information card 40. The former card has its own coordinately disposed permanent magnets facing the solenoids 35 which latter elements are again folded around the two information cards. In addition, suitable magnetic shielding means, also not shown, are provided between the back-to-back information cards to prevent interaction between adjacent permanent magnets. An additional two-plane unit of circuit boards, such as the circuit boards 11 and 12, is provided around which the folded and refolded tapes 20 and 30 make up the next memory planes adjacent the plane A in a manner identical to the described for the planes A and B. The memory stack is built up in the opposite direction from the plane B by adding an information card, not shown in the drawing, back-to-back with the information card 50, with its particular pattern of information bearing permanent magnets in correspondence with the information addresses of the refolded tapes 20 and 30 in that direction. The information cards 40 and 50 and the cards of the adjacent memory planes may conveniently be maintained in a readily changeable position by holding or clamping means readily devisable by one skilled in the art. Since such holding means do not comprise an inventive element of the present invention they are not necessary for a complete understanding of the principles of this invention and accordingly are not shown in the drawing.

After being folded through other planes $A+n$ of the memory stack, one two-plane unit of which is shown in FIG. 2A, one end of each of the solenoids 35 is connected via a switch wiper 52 and a pair of contacts 53*a* and 53*b* to a coincident current word selection switch 54. The selection switches, of which only the switches $54_3$ and $54_4$ are represented in FIG. 2B, may each comprise any suitable current source well known in the art capable of selectively providing positive and negative current pulses on the terminals 53*b* and 53*a*, respectively, of a magnitude and polarity to be described hereinafter. Accordingly, the sources 54, where shown, are represented only in block symbol form. After similarly being folded through the other planes $A+n$ of the memory stack, one end of each of the wire memory elements 21 is connected to a ground bus 22 also shown in FIG. 2B. The other end of each of the solenoids 35, after being folded through other planes $B+m$, is connected to a ground bus 36 shown in FIG. 2B. The wire memory elements 21, after also being folded through the other planes $B+m$, are connected at their other ends through resistors 23 to a bus 24 connected to a positive potential source 25. The other end of each of the wire memory elements 21 shown in FIG. 2B is also connected through an amplifying means 26 to information utilization circuits 27. Amplifying means such as the means 26 capable of amplifying output signals of the character to be described which are generated in the magnetic wire memory elements 21 are known in the art. Accordingly, the means 26 are shown only in symbolic form in the drawing. The tab 14 terminating at one end of the series connected solenoids 13*a* and 13*b* is connected to a wiper 42 of a switching means having a pair of contacts 43*a* and 43*b*. The latter contacts are in turn connected to the terminals of a second coincident current selection switch 44. The latter switch 44 is also of a character known in the art and is capable of providing a pair of simultaneous output current pulses of opposite polarity to each of the contacts 43*a* and 43*b* of a magnitude to be described hereinafter. Since the source 44 will also be known to one skilled in the art, it also need be shown only in block symbol form to obtain a complete and full understanding of the present invention. It is to be understood that each of the additional two-plane units $A+n$ and $B+m$ has associated therewith a similar two output source 44. Selective control of the sources 54 and 44 is accomplished by external circuitry of the system in which the memory stack of the present invention may comprise part and does not comprise an inventive element of the present invention. The other end of the series connected solenoids 13*a* and 13*b* is connected to ground not shown in FIG. 2A.

Before proceeding to a detailed description of an exemplary storage and readout cycle of operation of an illustrative embodiment of this invention, one operating characteristic of magnetic wire memory elements may be generally considered. In FIG. 4 is shown an idealized hysteresis loop 60 of the magnetic material of which the magnetic components of the wire memory elements 21 of this invention may be fabricated. The fact that the loop 60 falls short of optimum rectangularity, shown as exaggerated in FIG. 4 for purposes of description, may be due to the inherent properties of the magnetic material, for example, or it may be due to the physical dimensions of the wire segments which comprise the basic magnetic switching units of this invention. Thus, as has been mentioned previously herein, it is frequently advantageous in order to achieve memories of maximum capacity to reduce the lengths of the address segments of the wire memory elements as far as possible within the operating limits of the magnetic materials. However, as the lengths are reduced it has been found that a point is reached at which some rectangularity of the hysteresis loop may be sacrificed. Although under these conditions sufficient magnetic remanence of the materials remains to provide the required flux switching responses during interrogation, coincident current techniques have generally encountered critical operating margins. Thus, reference to FIG. 4 illustrates that even if one of the partial drives $h_1'$ is permitted to cause a flux excursion at an address segment from a remanent point *r* around the "knee" of the loop, the coincident application of the other partial drive $h_2'$ may still not be sufficient to drive the flux to a condition of opposite saturation. As is also clear from FIG. 4, even when the drives are of insufficient aggregate magnitude to achieve a complete flux switching, each alone may yet cause troublesome partial flux excursion at unselected address segments to which only one of the partial drives is applied.

In accordance with one aspect of this invention a biasing current is applied to each of the magnetic wire memory elements 21 through the load-resistors 23 via the conducting bus 24 from the source 25. The resulting magnetomotive biasing drive $h_b$ maintains each of the address segments defined on the wire elements to a point *s* in one direction of saturation. In the particular embodiment of this invention being described, the direction of the biasing current is negative and the biasing drive is determined as maintaining each of the address segments in negative saturation. The normal magnetic state of the address segments is thus the saturation point indicated as *s* on the loop 60 of FIG. 4.

The information cards, such as the cards 40 and 50, with the permanent magnets 41 and 51, respectively, affixed thereto, add other fields which magnetically affect the information address segments in a manner which may now be described. In describing an illustrative storage and readout cycle of operation of the embodiment of this invention shown in part in FIGS. 2A and 2B, it will be assumed that the memory planes A and B are being interrogated. In this connection reference will be had to the sectional view depicted in FIG. 5 where particular corresponding bit addresses of the words of the two planes A and B are arranged along the wire memory element 21'. For purposes of describing an illustrative storage and interrogation operation of this invention, it will be necessary only to consider a single bit address of particular words W under representative operating conditions. Thus, the storage of information and its interrogation in the bit addresses $c$ and $d$ of the plane A and the addresses $c'$ and $d'$ of the plane B will now be considered.

Figure 5:
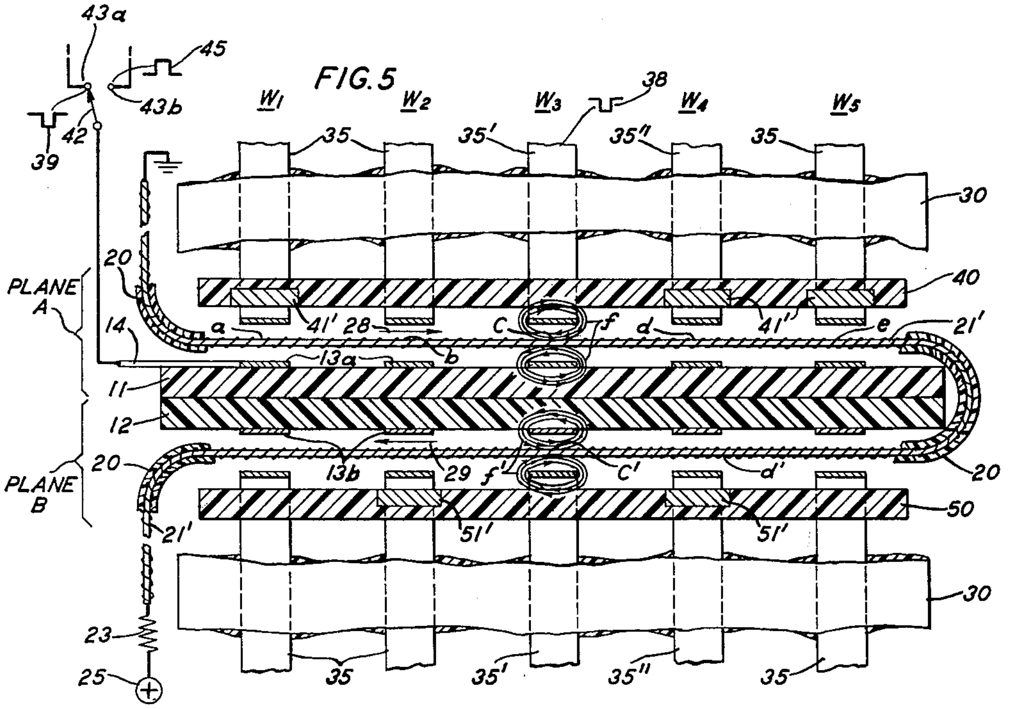
FIG. 5 is a cross-sectional view of the assembly shown in FIG. 3 taken along the lines 5—5.

It will be recalled that, as a result of the biasing potential 25 connected to one end of the wire memory element 21', the entire element 21', including each of the information address segments defined thereon, is magnetically biased to the point indicated as $s$ on its hysteresis loop which is depicted in FIG. 4. The magnetic bias $h_b$ so applied is represented in FIG. 5 by the arrows 28 and 29. It may be noticed that as a result of the folded arrangement of the tape 20 and its embedded wire elements 21, the magnetic bias is oppositely directed with respect to the memory planes A and B under consideration. It will also be appreciated that the alternating directions of the magnetic bias continues throughout the memory stack of which the planes A and B are one two-plane unit.

To interrogate the information word $W_3$ of plane A, for example, the wiper $52_3$ shown in FIG. 2B is moved into contact with its terminal 53a. A negative current pulse 38 is then applied from the selection switch $54_3$ to the solenoid 35'. The current pulse 38 is of a sufficient magnitude to supply only a part of the drive necessary to cause a complete flux excursion from the biasing point $s$ of the loop 60 of FIG. 4 to opposite saturation at the point $t$, for example. The magnitude of the pulse 38 may conveniently be such as to develop a magnetomotive drive slightly less than the opposing biasing drive $h_b$. The partial drive developed by the pulse 38 is designated as $h_1$ in FIG. 4 and the direction of the opposing drives are indicated by arrowheads. It will be apparent from the organization of the memory stack described that the current pulse 38 applied to the solenoid 35' magnetically affects the information addresses of each of the corresponding information words defined by the latter solenoid as it is folded and refolded through the memory stack. To effect an interrogation of the selected word $W_3$ and its included information bit contained in the address $c$ another negative current pulse 39 is applied from the pulse source 44 via the contact 43a and wiper 42 to each of the series connected solenoids 13a and 13b. The magnitude of the pulse 39 is also sufficient to provide, by means of the solenoid 13a a sufficient magnetomotive drive to cause a flux excursion from the biasing point $s$ on the loop 60 of FIG. 4 substantially equal to the drive $h_1$ supplied by the coincidentally applied pulse 38. Thus, each of the pulses 38 and 39 when applied alone is able to cause a flux excursion only to the point $u$ on the loop 60. When the pulse 39 is applied coincidentally with the pulse 38, an additional drive is generated, which drive is designated as $h_2$ in FIG. 4. The additive drives $h_1$ and $h_2$ are now sufficient to cause a complete flux excursion from the point $s$ to the point $t$ on the loop 60. The fields generated around the solenoids 35' and 13a and their directions are represented in FIG. 5 by the lines $f$.

The flux excursion thus caused in the flux component of the wire element 21' at the information address $c$ generates, across the ends of the latter element, a readout signal which in the conventional manner is indicative of the storage at the latter information address of a binary "1." This readout signal is amplified by the amplifier 26 and transmitted to the utilization circuits 27. It will be apparent from FIG. 5 that partial drives will be applied during the foregoing interrogation to each of the address segments of the memory elements 21 of other planes of the memory stack defined by the energized solenoid 35'. In addition, partial drives will be applied during the same interrogation to each of the address segments defined by the energized solenoids 13a and 13b of the two planes A and B. As is known, flux excursions resulting from these drives generate in the wire memory elements 21 shuttle output signals. However, as a result of the alternating directions in which the wire elements 21 and solenoids 13a and 13b are arranged in each two-plane unit, the shuttle signals so developed are advantageously effectively cancelled.

During the above interrogation, it is clear that only the address segments carrying the word $W_3$ have applied thereto the additive drives sufficient to cause a complete flux excursion in those segments. In those memory elements 21 of the plane A in which a complete flux switching occurred readout signals are generated in the manner described for the memory element 21'. In the plane B however a coincidence of drives also occurred in the information address segment $c'$. Due to the opposing directions of the current pulse 38 in the folded solenoid 35', however, the partial drives $h_1$ and $h_2$ generated by the latter pulse and the pulse 39 effectively cancel at the address $c'$ of the plane B. Thus, as a result of the coincident interrogating current pulses 38 and 39 only the word $W_3$ of the plane A is interrogated. Upon the termination of the coincident current pulses 38 and 39 the biasing current supplied from the source 25 restores each of the interrogated address segments as well as the shuttled address segments to the magnetic saturation point $s$ of the loop 60.

The information addresses $a$ and $e$ of the words $W_1$ and $W_5$ of plane A are interrogated in a manner similar to that described for the address $c$. Thus, with the switch wipers 42 and 52 on the respective contacts 43a and 53a, negative coincident current pulses are applied to the selected associated solenoids 35 and 13a and 13b from sources 54 and 44, respectively. The magnetomotive drives developed thereby will also be in the directions described above and as shown in FIGS. 4 and 5. In order, however, to achieve magnetomotive drives of the proper polarity, in view of the serially connecting arrangement of the energizing solenoids, to interrogate the addresses $b$ and $d$, a positive coincident current pulse is applied from the associated selected source 44 via a contact 43b to the solenoids 13a and 13b defining the $b$ or $d$ address segments. The polarity of the coincident current pulse applied to the solenoid 35 in this case remains the same. Cancellation of drives also occurs in the plane B where such drives coincide during the interrogation of addresses $b$ and $d$ of plane A. In FIG. 6 the polarities of each of the coincident current pulses applied from the sources 44 and 54 to achieve an interrogation of the words $W_1$ through $W_5$ is shown.

In the foregoing has been described the interrogation and readout of a binary "1" from an information address of plane A. Storage of a binary "0" and discrimination between the latter value and a binary "1" is achieved by means of the permanent magnets 41 and 51 affixed to the information cards 40 and 50, respectively. In this connection an illustrative interrogation of the information address segment $d$ of the word $W_4$ defined by the solenoid 35'' will be described. At this address a permanent magnet 41' is so positioned that its field saturates the address segment $d$ in a direction opposite to that of the magnetic bias $h_b$. The field of the permanent magnet and its direction is represented in FIG. 4 by the drive $h_p$ and saturates the address segment $d$ to the point $v$ represented on the loop 60. With the wipers 42 and $52_4$ on the contacts 43b and 53a of the sources 44 and $54_4$, respectively, a positive and a negative coincident current pulse are applied to the solenoids 13a and 13b and to the solenoid 35'', respectively. The resulting additive drives at the address segment $d$ now however fail to cause a flux switching at the latter segment since the segment $d$ is already saturated in the flux switching direction. Accordingly, during this interrogation no readout signal is generated across the ends of the wire memory element 21' on which the address segment $d$ is defined. The absence of a readout signal is in accord with conventional practice and is indicative of the storage at the address segment $d$ of a binary "0." The cancellation of shuttle signals generated by partial interrogating drives in the planes is again achieved due to the alternating directions of the energizing solenoids of the memory as previously described. Cancellation of the interrogating partial drives applied to the corresponding address segment $d'$ of the memory plane B is also achieved in the manner described hereinbefore.

Selected words of the plane B are interrogated in a manner similar to that of the illustrative interrogation of plane A described in the foregoing. However, to obtain the proper directions of drives to achieve addition at the selected address of plane B and cancellation at the corresponding address of plane A, particular polarities of the coincident current pulses are again selected. Thus, taking the information address $c'$ of plane B, reference to the polarity table of FIG. 6 shows that a negative coincident current pulse applied to the series connected solenoids 13*a* and 13*b* from the source 44 and a positive coincident current pulse applied to the solenoid 35' from the source $54_3$ will cooperate to generate an interrogating drive of the proper polarity to counter the bias $h_b$. This may be demonstrated by the directions of the lines of force $f'$ in FIG. 5. It may further be seen that during the interrogation of the address $c'$, the coincident drives applied to the corresponding address $c$ of the plane A now cancel. The complete flux switching of any address segment of plane B during its interrogation will again generate a readout signal indicative of a binary "1" across the memory element 21 on which the switching address segment lies. A binary "0" is manifested in an information address of the plane B by the ability of the address segment to respond to the applied interrogating drives as controlled by the magnets 51 of the information card 50. The interrogation of a binary "0" in the plane B is thus similar to that described in connection with plane A.

The operation of other memory planes $A+n$ and $B+m$ is similar to the illustrative storage and interrogation operations described in detail in connection with the two-plane unit of planes A and B. Associated pulse sources 44 and 54 are simultaneously energized after the wipers 42 and 52 have been set in accordance with the particular memory plane and information word to be interrogated. In each case after interrogation the magnetic bias $h_b$ restores an address segment containing a binary "1" to its flux switchable magnetic state.

In depicting various views of the illustrative embodiment of this invention in the drawing the relative physical dimensions of the elements have been exaggerated to better show the relationships of those elements. Further, only those portions and components of the embodiment shown have been included to provide a complete understanding of the organization and principles of operation of this invention.

What has been described is further to be considered only one specific illustrative embodiment of the present invention. Accordingly, it is to be understood that various and numerous modifications may be made therein without departing from the spirit and scope of this invention.

What is claimed is:

1. A coordinate memory array comprising a plurality of parallelly arranged magnetic wire memory elements comprising Y coordinates of said array, each of said memory elements having a helical flux path axially coincident therewith, each of said flux paths having two remanent magnetic states, a first plurality of X coordinate solenoids inductively coupled to said flux paths and arranged transversely thereto, said first plurality of X coordinate solenoids being serially connected at alternate ends, a second plurality of X coordinate solenoids also inductively coupled to said flux paths and in registration with said first plurality of X coordinate solenoids, said first and said second plurality of X coordinate solenoids defining a coordinate array of information address segments on said flux paths, setting means for setting particular ones of the address segments defined by a selected one of said second plurality of X coordinate solenoids to one of said stable remanent states, said setting means comprising means for applying a biasing current to each of the address segments defined by said selected one of said second plurality of X coordinate solenoids, switching means for switching said particular ones of said address segments to the other of said stable remanent states comprising means for applying a first partial switching current to said serially connected first plurality of X coordinate solenoids, means for applying a second partial switching current to said selected one of said second plurality of X coordinate solenoids coincidentally with said first partial switching current, and magnet means arranged in inductive relationship with the address segments defined by said selected one of said second plurality of X coordinate solenoids other than said particular address segments for preventing the switching of said last-mentioned address segments; and means for detecting flux switching in said flux paths.

2. A coordinate memory array as claimed in claim 1 in which the magnitude of said biasing current is at least equal to the magnitude of either of said first or said second partial switching currents and is less than the sum of said last-mentioned magnitudes.

3. A magnetic memory construction comprising a plurality of parallelly arranged first energizing conductors, said plurality of first energizing conductors comprising flat strip solenoids, said first energizing conductors being serially connected at alternate ends, a plurality of parallelly arranged magnetic wire memory elements positioned transversely on said plurality of first energizing conductors and in inductive coupling therewith, and a plurality of parallelly arranged second energizing conductors positioned transversely on said plurality of wire memory elements also in inductive coupling therewith and in registration with said first energizing conductors said wire memory elements and said second energizing conductors being mounted in nonmagnetic nonconducting tapes.

4. A magnetic memory construction according to claim 3 also comprising an information card positioned on said plurality of second energizing conductors, said card having mounted thereon a plurality of magnet means arranged at the intersections of said second energizing conductors and said wire memory elements in accordance with particular information stored in said magnetic memory construction.

5. In a magnetic memory construction, the combination comprising a first plurality of parallelly arranged first energizing conductors, a second plurality of first energizing conductors parallelly arranged in registration with said first plurality of first energizing conductors, said first and said second plurality of first energizing conductors being serially connected together at alternate ends, a plurality of parallelly arranged magnetic wire memory elements positioned transversely on said first plurality of first energizing conductors and in inductive coupling therewith, said plurality of wire memory elements being folded into a transverse position on said second plurality of first energizing conductors and also into inductive coupling therewith, and a plurality of parallelly arranged second energizing conductors folded transversely around said folded wire memory elements and into inductive coupling therewith and in registration with said first and said second plurality of first energizing conductors.

6. In a magnetic memory construction, the combination comprising a first plurality of parallelly arranged first flat strip solenoids, a second plurality of first flat strip solenoids parallelly arranged in registration with said first plurality of first solenoids, said first and said second plurality of first solenoids being serially connected together at alternate ends, a first insulated tape having mounted therein a plurality of parallelly arranged magnetic wire memory elements transversely folded around said first and said second plurality of first flat strip solenoids to position said wire memory elements into inductive coupling with said first and said second plurality of first solenoids, anl a second insulated tape having mounted therein a plurality of parallelly arranged second flat strip solenoids transversely folded around said folded first insulated tape to position said second solenoids into inductive coupling with said wire memory elements and into registration with said first and said second plurality of first solenoids, said first plurality of first solenoids and said plurality of folded second solenoids defining a first coordinate array plane of information address segments on said plurality of wire memory elements on one folded side thereof and said second plurality of first solenoids and said plurality of folded second solenoids defining a second coordinate array plane of information address segments on said plurality of wire memory elements on the other folded side thereof.

7. In a magnetic memory construction, the combination according to claim 6 also comprising a first information card having mounted thereon a first plurality of magnet means arranged in inductive relationship with particular ones of said address segments of said first plane in accordance with stored information and a second information card having mounted thereon a second plurality of magnet means arranged in inductive relationship with particular ones of said address segments of said second plane in accordance with stored information.

8. In a magnetic memory construction, the combination according to claim 7 also comprising a third and a fourth plurality of parallelly arranged first flat strip solenoids, said third and fourth plurality of first solenoids being serially connected together at alternate ends and being in registration with said first and said second plurality of first solenoids, said first insulated tape being transversely folded and refolded to position said wire memory elements into inductive coupling with said third and said fourth plurality of first solenoids, and said second insulated tape being transversely folded and refolded to position said second solenoids into inductive coupling with said wire memory elements and into registration with said third and said fourth plurality of first solenoids, said third plurality of first solenoids and said plurality of folded second solenoids defining a third coordinate array plane of information address segments on said plurality of wire memory elements on a third folded side thereof and said fourth plurality of first solenoids and said plurality of folded second solenoids defining a fourth coordinate array plane of information address segements on said plurality of wire memory elements on a fourth folded side thereof, a third information card having mounted thereon a third plurality of magnet means arranged in inductive relationship with particular ones of said address segments of said third plane in accordance with stored information, and a fourth information card having mounted thereon a fourth plurality of magnet means arranged in inductive relationship with particular ones of said address segments of said fourth plane in accordance with stored information.

9. In a magnetic memory construction, the combination comprising a pair of parallelly arranged first energizing conductors, a magnetic wire memory element folded around said pair of first energizing conductors and into inductive coupling therewith at a first and a second information address segment of said wire element, a second energizing conductor folded around said folded wire memory element and into inductive coupling therewith also at said first and said second information address segments, means for applying a first current pulse to one of said first energizing conductors in one direction, said pair of first energizing conductors being connected such that said first current pulse is also applied to the other of said first energizing conductors in the same direction, and means for applying a second current pulse to said second energizing conductor, said first and said second current pulses each being of a polarity such as to generate in said first and said second energizing conductors additive magnetomotive drives with respect to said first information address segment and cancelling magnetomotive drives with respect to said second information address segment.

10. In a magnetic memory construction, the combination as claimed in claim 9 also comprising means for magnetically biasing said magnetic wire memory element in a direction opposite to that of said additive magnetomotive drives.

11. In a magnetic memory construction, the combination as claimed in claim 10 also comprising magnet means for selectively magnetically saturating said first information address segment for preventing flux switching in said last-mentioned address segment.

References Cited in the file of this patent

UNITED STATES PATENTS

| | | |
|---|---|---|
| 2,781,503 | Saunders | Feb. 12, 1957 |

FOREIGN PATENTS

| | | |
|---|---|---|
| 205,776 | Austria | Oct. 10, 1959 |
| 1,190,683 | France | Apr. 6, 1959 |

OTHER REFERENCES

Publication IV: An article entitled "Magnetic Memory Package," by D. E. Elder, published February 1959 in "IBM Technical Disclosure Bulletin," vol. 1, No. 5, p. 17. (Copy in Div. 42.)

Publication I: An article entitled "New Developments on Magnetic Materials and Applications," by W. Anott, published February 1959 in "Electrical Manufacturing." (Copy in Div. 42.)

Publication II: An article entitled "Thin Films, Memory Elements," published June 1958 in "Electrical Manufacturing," Vol. 61, No. 1, pp. 95–98. (Copy in Div. 42.)

Publication III: An article entitled "High Speed Coincident-Flux Magnetic Storage Principles," by L. P. Hunter and E. W. Bauer, published November 1956 in "Journal of Applied Physics," vol. 27, No. 11, pp. 1257–1260. (Copy in Div. 42.)